United States Patent
Wang et al.

(10) Patent No.: US 11,859,689 B2
(45) Date of Patent: Jan. 2, 2024

(54) ACTIVE CONTROL TYPE ANTI-YAW DAMPER, DAMPING SYSTEM AND VEHICLE

(71) Applicant: CRRC QINGDAO SIFANG CO., LTD., Shandong (CN)

(72) Inventors: Xu Wang, Shandong (CN); Haipeng Kong, Shandong (CN); Xiaoning Cao, Shandong (CN); Zhenxian Zhang, Shandong (CN); Haixiao Liang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 208 days.

(21) Appl. No.: 17/602,811

(22) PCT Filed: May 18, 2020

(86) PCT No.: PCT/CN2020/090834
§ 371 (c)(1),
(2) Date: Oct. 11, 2021

(87) PCT Pub. No.: WO2020/253441
PCT Pub. Date: Dec. 24, 2020

(65) Prior Publication Data
US 2022/0154796 A1 May 19, 2022

(30) Foreign Application Priority Data

Jun. 20, 2019 (CN) .......................... 201910536511.8

(51) Int. Cl.
*F16F 9/20* (2006.01)
*F16F 9/46* (2006.01)
(52) U.S. Cl.
CPC ................ *F16F 9/20* (2013.01); *F16F 9/463* (2013.01); *F16F 9/465* (2013.01)

(58) Field of Classification Search
CPC ............... F16F 9/20; F16F 9/463; F16F 9/465
See application file for complete search history.

(56) References Cited

U.S. PATENT DOCUMENTS

| 3,807,678 A | 4/1974 | Karnopp et al. |
| 4,511,022 A | 4/1985 | Thomas et al. |
| (Continued) | | |

FOREIGN PATENT DOCUMENTS

| CN | 1699781 A | 11/2005 |
| CN | 101532515 A | 9/2009 |
| (Continued) | | |

OTHER PUBLICATIONS

China National Intellectual Property Administration, International Search Report issued in corresponding Application No. PCT/CN2020/090834, dated Aug. 13, 2020.

(Continued)

*Primary Examiner* — Melody M Burch
(74) *Attorney, Agent, or Firm* — Stites & Harbison, PLLC; Jeffrey A. Haeberlin

(57) ABSTRACT

An active control anti-yaw damper (100) is provided. When a piston (2) of the active control anti-yaw damper (100) reciprocates inside a hydraulic cylinder (1), an interior of the hydraulic cylinder (1) is divided into two cylinder blocks (PA, PB) which communicate with an oil reservoir through two main oil lines respectively to form a primary loop between the hydraulic cylinder (1) and the oil reservoir; a reversing valve (PV3) is installed between the two main oil lines and the oil reservoir and is configured to change a flow direction of the primary loop when the active control anti-yaw damper (100) is in an active mode and adjust a displacement of the piston (2) within the hydraulic cylinder (1).

17 Claims, 7 Drawing Sheets

(56) References Cited

U.S. PATENT DOCUMENTS

| | | |
|---|---|---|
| 5,147,018 A | 9/1992 | Kobori et al. |
| 5,682,980 A | 11/1997 | Reybrouck |
| 6,755,113 B2 | 6/2004 | Shih |
| 2004/0020355 A1 | 2/2004 | Shih |
| 2010/0155186 A1 | 6/2010 | Preukschat et al. |

FOREIGN PATENT DOCUMENTS

| | | | | |
|---|---|---|---|---|
| CN | 102069813 A | | 5/2011 | |
| CN | 102720795 A | | 10/2012 | |
| CN | 102808886 A | | 12/2012 | |
| CN | 203670582 U | * | 6/2014 | |
| CN | 106103145 A | | 11/2016 | |
| CN | 206159354 U | | 5/2017 | |
| CN | 107107698 A | | 8/2017 | |
| CN | 107116983 A | | 9/2017 | |
| CN | 107816505 A | | 3/2018 | |
| CN | 108136869 A | | 6/2018 | |
| CN | 110360260 A | | 10/2019 | |
| DE | 220 674 A1 | | 4/1985 | |
| DE | 10 2009 041110 A1 | | 3/2011 | |
| DE | 102016216546 A1 | * | 3/2018 | ............. F16F 9/325 |
| DE | 10 2017 106802 A1 | | 10/2018 | |
| EP | 0 353 703 B1 | | 1/1993 | |
| EP | 1 252 032 B1 | | 3/2005 | |
| EP | 3 216 633 A1 | | 9/2017 | |
| EP | 3 357 723 A1 | | 8/2018 | |
| JP | H01-266332 A | | 10/1989 | |
| JP | H05-296281 A | | 11/1993 | |
| JP | H08-253146 A | | 10/1996 | |
| JP | 2000264034 A | | 9/2000 | |
| JP | 2001-010324 A | | 1/2001 | |
| JP | 2007-296936 A | | 11/2007 | |
| JP | 2012076668 A | * | 4/2012 | |
| JP | 2014-156882 A | | 8/2014 | |
| JP | 2015-101183 A | | 6/2015 | |
| JP | 2018-122624 A | | 8/2018 | |
| WO | WO-2009072672 A1 | * | 6/2009 | ............. B61F 5/22 |
| WO | WO-2011120834 A1 | * | 10/2011 | ............. B61D 17/02 |
| WO | WO-2016060066 A1 | * | 4/2016 | ............. B61F 5/24 |

OTHER PUBLICATIONS

The State Intellectual Property Office of People's Republic of China, Search Report issued in corresponding Application No. 2019105365118, dated Aug. 25, 2020.

The State Intellectual Property Office of People's Republic of China, First Office Action issued in corresponding Application No. 201910536511.8 dated Aug. 31, 2020.

The State Intellectual Property Office of People's Republic of China, Second Office Action issued in corresponding Application No. 201910536511.8 dated Apr. 9, 2021.

European Patent Office. Extended European Search Report issued in corresponding Application No. EP20827428.2, dated Jul. 29, 2022.

IP Australia. Examination report No. 1 for standard patent application (Office Action) issued in corresponding Australian Application No. 202097373, dated Nov. 30, 2022.

Japan Patent Office. Notification of Reasons for Refusal (Office Action) issued in corresponding Japanese Application No. 2021-568945, dated Dec. 5, 2022.

* cited by examiner

ACTIVE CONTROL TYPE ANTI-YAW DAMPER, DAMPING SYSTEM AND VEHICLE

CROSS-REFERENCE TO RELATED APPLICATION

The present application claims priority to Chinese Application No. 2019105365118, filed on Jun. 20, 2019, entitled "Active Control Anti-yaw damper, Damping system, and Vehicle", which is hereby incorporated by reference in its entirety.

FIELD OF TECHNOLOGY

The present application relates to a technical field of dampers, and in particular to an active control anti-yaw damper, a damping system, and a vehicle.

BACKGROUND

An anti-yaw damper is an important part of a suspension system and has a main function of generating a damping force against revolution between a bogie frame and a vehicle body, consuming the vibration energy therebetween, thereby suppressing yaw vibration.

The anti-yaw damper is a key component that affects the stability of the train. When the train runs in different conditions, it has different requirements for parameters of the damper. According to the damping principle, the traditional anti-yaw damper is a passive anti-yaw damper. The traditional passive damper has a fixed characteristic curve, and performance parameters of the traditional passive damper cannot be adjusted in real time according to requirements of the train.

Therefore, it is impossible for the traditional passive damper to keep the suspension system of the train always being in a best matching state according to the train's running requirements due to the fixed and non-adjustable performance parameters. Moreover, as there are more and more trains running across lines, countries and regions, the demand for the parameters of the damper becomes more and more diversified, and it is difficult for the traditional passive damper to be compatible with the needs of different lines.

Currently, during the entire repair cycle of vehicles, requirements for the parameters of anti-yaw damper are not the same. Since a taper of a new wheel is smaller, the anti-yaw damper is required to mainly exhibit stiffness characteristics; while the taper of the wheel becomes larger as the running mileage increases, and anti-yaw dampers are required to exhibit damping characteristics. Moreover, it is difficult for the traditional passive damper to achieve the purpose of extending the repair period and reducing operating costs since it has fixed and non-adjustable performance parameters. Especially when the vehicle is running in a curve, the angle of attack between the wheel and rail becomes larger, which increases the lateral force of the wheel and rail, further affects the safe operation of the train, thereby limiting the running speed; meanwhile, the excessive angle of attack will cause serious wear of the wheel and rail, which increases operation and maintenance costs.

BRIEF SUMMARY

(1) At Least of Technical Problems to be Solved

An active control anti-yaw damper and a damping system, and a vehicle are provided according to an embodiment of the present application, which may solve various defects due to failure of adjustment for the performance parameters of the traditional anti-yaw dampers in the prior art when the trains run on curve.

(2) Technical Solutions

In order to solve at least the above technical problems, the present application provides an active control anti-yaw damper, which includes a hydraulic cylinder; a piston configured to divide an interior of the hydraulic cylinder into two cylinder blocks when reciprocating inside the hydraulic cylinder, an oil reservoir; and a reversing valve, wherein the two cylinder blocks communicate with the oil reservoir through two main oil lines respectively to form a primary loop; the reversing valve is installed between the two main oil lines and the oil reservoir and is configured to change a flow direction of the primary loop when the active control anti-yaw damper is in an active mode and adjust a displacement of the piston within the hydraulic cylinder.

According to an embodiment of the present application, the two cylinder blocks communicate with the reversing valve through the two main oil lines, respectively, and the reversing valve communicates with the oil reservoir through two drive oil lines, respectively, and the reversing valve has at least two switchable working positions.

According to an embodiment of the present application, the reversing valve includes a first working position and a second working position. The first working position and the second working position are each provided with two diversion ports configured to connect the two main oil lines; and the two diversion ports at the first working position have positions opposite to the two diversion ports at the second working position.

According to an embodiment of the present application, the damper further includes a drive mechanism connected in series on any of the drive oil lines.

According to an embodiment of the present application, the drive mechanism includes a drive motor and a drive pump, and the drive pump is connected in series on the drive oil line and connected with the drive motor.

According to an embodiment of the present application, the damper further includes an accumulation branch having one end communicating with the drive oil line and being located between the reversing valve and the drive mechanism and another end communicating with the oil reservoir, and a pressure sensor, an accumulator and a relief valve are connected in series on the accumulation branch.

According to an embodiment of the present application, at least one relief branch is presented between the two main oil lines, at least one relief branch is connected in parallel with each other, and each relief branch is connected in series with a relief valve.

According to an embodiment of the present application, the damper further includes at least two parallel branches, both ends of each parallel branch communicate with the two main oil lines, respectively, and each of the branches respectively includes a one-way throttle valve and the adjustable solenoid valve communicated in series and the adjustable solenoid valve is configured to adjust a damping coefficient of the damper when the damper is in a semi-active mode.

According to an embodiment of the present application, the parallel branch includes a first branch and a second branch, wherein one end of the first branch and one end of the second branch are connected in parallel at a first node, and the other end of the first branch and the other end of the second branch are connected in parallel at a second node, and the first node and the second node are connected to the two main oil lines, respectively; the first branch has an opposite flow direction to the second branch.

According to an embodiment of the present application, the first node and the second node communicate with the oil reservoir through oil reservoir lines, respectively, and each of the oil reservoir lines is connected in series with a throttle valve.

According to an embodiment of the present application, a relief oil line is presented between the first node and the oil reservoir, the relief oil line is connected in parallel with each of the oil reservoir lines, and a relief valve is connected in series on the relief oil line.

According to an embodiment of the present application, the damper further includes an emergency oil line having both ends connected to the two main oil lines, respectively, the emergency oil line includes an emergency throttle valve and a non-adjustable solenoid switch valve connected in series and the solenoid switch valve is configured to enable the emergency oil line when the damper is in a passive mode.

According to a second aspect of the present application, a damping system is provided, which includes a controller and at least one active control anti-yaw damper as described above mounted on a bogie, a signal input end and a signal output end of the controller are connected with each of the dampers, respectively.

According to an embodiment of the present application, the damping system further includes a data acquisition mechanism including pressure sensors and a displacement sensor, the pressure sensors are provided inside the two cylinder blocks of the hydraulic cylinder, respectively, the displacement sensor is installed on the piston, and the pressure sensors and the displacement sensor are connected to the signal input end of the controller, respectively.

According to a third aspect of the present application, a vehicle including the above-mentioned damping system is provided.

Beneficial Effects

Through the technical solution above of the present application, at least the following beneficial effects are achieved:

On the one hand, when the piston of the active control anti-yaw damper according to the present application reciprocates inside a hydraulic cylinder, an interior of the hydraulic cylinder is divided into two cylinder blocks which communicate with an oil reservoir through two main oil lines respectively to form a primary loop between the hydraulic cylinder and the oil reservoir; a reversing valve is installed between the two main oil lines and the oil reservoir and is configured to change the flow direction of the primary loop when the damper is in an active mode and adjust the displacement of the piston within the hydraulic cylinder. When the active control anti-yaw damper is switched to the active mode, the displacement of the piston is changed through the oil pressure difference between the two cylinder blocks inside the hydraulic cylinder, so that the problem that the performance parameters of traditional anti-yaw dampers in the prior art cannot be adjusted and consequently a bogie is in a radial position relative to the vehicle body when the vehicle runs in a curve in the prior art is solved, thereby the curve negotiation speed of the train is increased, the wheel-rail wear is reduced, and the service life of the vehicle is prolonged.

On the other hand, the damping system according to the present application includes a controller and at least one above-mentioned active control anti-yaw damper installed on the bogie, and the signal input end and the signal output end of the controller are connected to respective dampers, respectively. Currently required performance parameters of the damper are calculated according to the actual operation state of the vehicle using the controller, the controller then transmits control signals with the current performance parameters to the damper, so as to ensure that the damper may adjust various performance parameters in real time according to the operation requirements of the vehicle to keep a suspension system of the train being in the best matching state, and may be compatible with different geographic environments, operation demands of vehicles required by different line, and the repair cycle of vehicles may be effectively extended, the service life of the vehicle is prolonged and the operating costs are decreased.

BRIEF DESCRIPTION OF THE DRAWINGS

In order to more clearly illustrate the technical solutions disclosed in the embodiments of the present application or the prior art, the drawings used in the descriptions of the embodiments or the prior art will be briefly described below. It should be noted that, the drawings in the following description are only illustrative embodiments of the present application, and other drawings can be obtained according to these drawings without any creative work for those skilled in the art.

Figure 1:
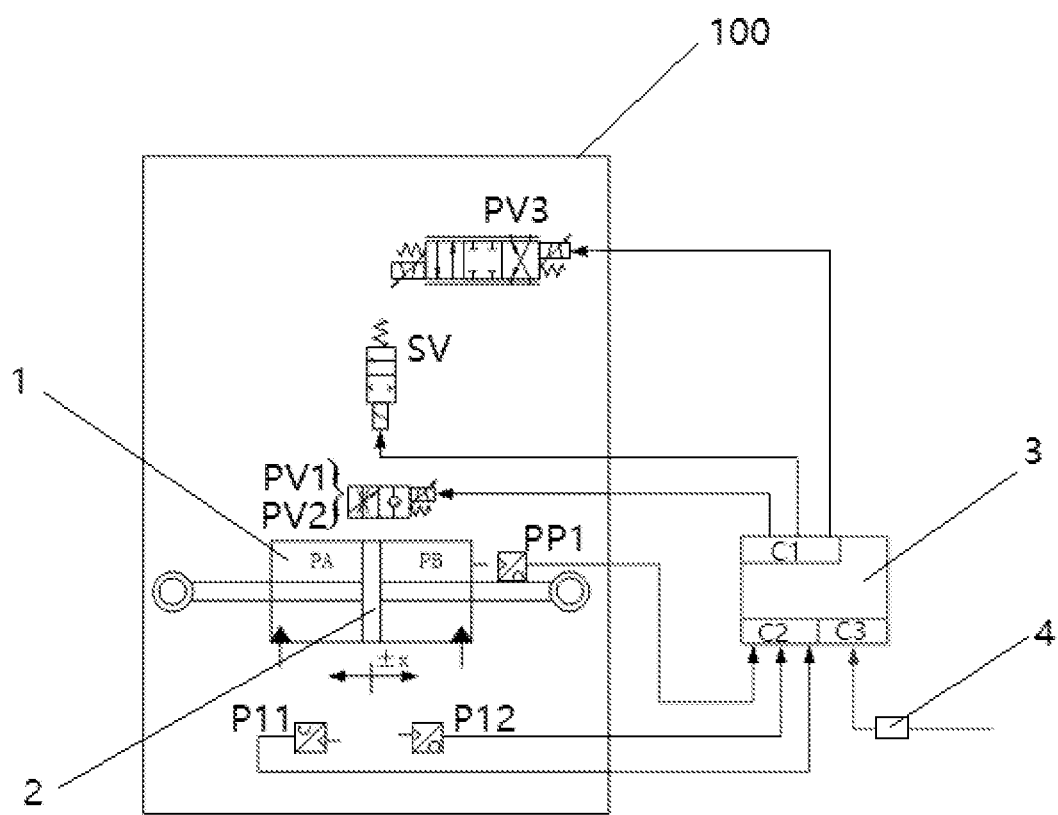
FIG. 1 is a control schematic structural diagram of a damping system according to an embodiment of the present application.

100: active control anti-yaw damper
1: hydraulic cylinder; 2: piston; 3: controller; 4: cut-off relay;
PA: first cylinder block; PB: second cylinder block;
C2: first interface; C2: second interface; C3: third interface;
N1: first node; N2: second node;
B1: first branch; PV1: first adjustable solenoid valve; CV1: first one-way throttle valve;
B2: second branch; PV2: second adjustable solenoid valve; CV2: second one-way throttle valve;

B3: emergency oil line; SV: solenoid switch valve; TV1: emergency throttle valve;
PA1: accumulator; PV3: reversing valve; S1: first working position; S2: second working position;
CV3: third throttle valve; CV4: fourth throttle valve; CV5: fifth throttle valve;
PRV1, PRV2, PRV3, PRV4: relief valve;
PP1: displacement sensor; P11, P12, P13: pressure sensor;
FP10: oil inlet; BP10: oil outlet; RP1: oil reservoir port.

DETAILED DESCRIPTION

The specific embodiments of the present application are further described in detail below in conjunction with the drawings and embodiments. The following embodiments are intended to illustrate the present application, but are not intended to limit the scope of the present application.

In the following description, the orientation or positional relationships indicated by terms such as "upper", "lower", "left", "right", "inside", "outside", "front", "rear", "head", "tail", etc. are based on the orientation or positional relationship shown in the drawings, and are merely for the convenience of describing the present application and simplifying the description, rather than indicating or implying that the device or component stated must have a particular orientation, is constructed and operated in a particular orientation, and thus is not to be construed as limiting the present application. Moreover, the terms "first", "second", "third", and the like are used for descriptive purposes only and are not to be construed as indicating or implying relative importance.

The present embodiment provides an active control anti-yaw damper 100, a damping system, and a vehicle. An oil line control structure of the active control anti-yaw damper 100 is shown in FIGS. 2 to 6. The damping system includes the active control anti-yaw damper 100, and a control structure of the damping system is shown in FIG. 1. The vehicle includes the damping system.

As shown in FIG. 1, the active control anti-yaw damper 100 according to the embodiment includes a hydraulic cylinder 1 and a piston 2. When the piston 2 reciprocates in the hydraulic cylinder 1, the interior of the hydraulic cylinder 1 is divided into two cylinder blocks. The hydraulic cylinder 1 shown in FIG. 1 is in a horizontally arranged state. As shown in FIG. 1, the piston 2 reciprocates leftwards and rightwards inside the hydraulic cylinder 1. A cylinder block on the left side of the piston 2 shown in FIG. 1 is a first cylinder block PA and the cylinder block on the right side of the piston 2 is a second cylinder block PB.

In the present embodiment, the cylinder blocks on the left and right sides of the piston 2 have equal volume, and oil line through which oil in two groups of branches flows are the same when the piston 2 reciprocates in the hydraulic cylinder 1 such that the damping system is more stable when the damping force of the damper is adjusted. Preferably, the hydraulic cylinder 1 is respectively connected with an oil inlet FP10 and an oil outlet BP10, so that the oil inlet FP10 is used to deliver oil and supply oil to the inside of the damper from the outside, and the oil outlet BP10 is used to guide excess oil out of the damper to ensure the balance of the oil system inside the damper.

Figure 2:
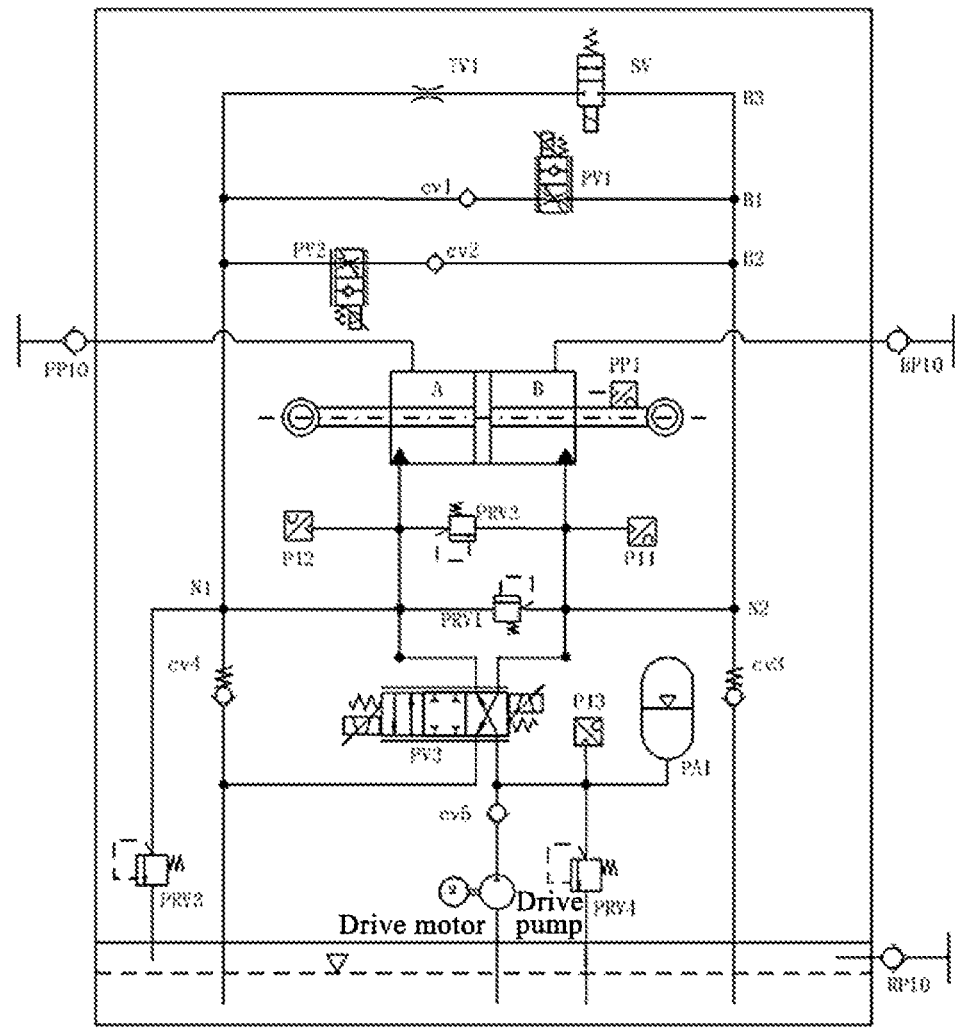
FIG. 2 is a schematic structural diagram showing oil lines of an active control anti-yaw damper according to an embodiment of the present application.

As shown in FIG. 2, the active control anti-yaw damper 100 further includes a reversing valve and an oil reservoir. The two cylinder blocks PA and PB of the hydraulic cylinder 1 communicate with the oil reservoir through two main oil lines, respectively, thereby forming a primary loop between the hydraulic cylinder 1 and the oil reservoir. When the oil inside in the oil reservoir is pumped into the hydraulic cylinder 1 through any of main oil lines, the piston 2 may be driven to reciprocate in the hydraulic cylinder 1.

In the present embodiment, a reversing valve is installed between the two main oil lines and the oil reservoir and is configured to change a flow direction of the primary loop when the damper is operating normally and in an active mode and thus the piston 2 is driven to reciprocate based on the change in the flow direction of the primary loop. Also, the reversing valve may be configured to adjust displacement of the piston within the hydraulic cylinder in real time as needed, so as to adjust various performance parameters in real time according to the operation requirements of the vehicle, and keep a suspension system of the train to be always in the best matching status.

The active control anti-yaw damper 100 according to the embodiment of the present embodiment has an active mode, which may be activated when the vehicle is moving in a curve. When the vehicle is running in a curve, the active control anti-yaw damper 100 automatically enters the active mode, so that the displacement of the piston 2 may be accurately adjusted by the primary loop, and thus the bogie is in a radial position relative to the vehicle body, so as to increase the curve negotiation speed of the train, reduce the wheel-rail wear, and prolong the service life of the vehicle.

In the present embodiment, in order to adjust the flow direction of oil in the primary loop accurately, on one hand, the two cylinder blocks PA and PB are connected to the reversing valve PV3 through two main oil lines; on the other hand, the reversing valve PV3 communicates with the oil reservoir through two drive oil lines respectively. The reversing valve PV3 has at least two switchable working positions S1 and S2, so that synchronously reversing of the oil in each main oil line can be achieved based on the switching between respective working positions. Synchronously reversing the two main oil lines indicates that when the reversing valve PV3 is in one working position, the flow direction of oil in the two main oil lines is set to be positive, then when the reversing valve PV3 is switched to the next working position, the flow direction of oil in the two main oil lines instantly becomes reversed.

In the present embodiment, the reversing valve PV3 includes a first working position S1 and a second working position S2. The first working position and the second working position are each provided with two diversion ports configured to connect the two main oil lines. The two diversion ports at the first working position S1 have positions opposite to that of the two diversion ports at the second working position S2. This arrangement may enable one diversion port originally connected to one of the main oil lines to be immediately switched to connect with the other main oil line and the other diversion port to be changed in the same way when the reversing valve PV3 switches the working position, so that the diversion port originally used as a liquid inlet may be immediately switched to a liquid outlet to drive the flow direction of the two main oil lines to be changed simultaneously. Preferably, the reversing valve PV3 is a three-position four-way solenoid valve. In addition to two working positions, the solenoid valve further includes a closed station. When the reversing valve PV3 is switched to the closed station, the reversing valve PV3 enables two main oil lines and the two drive oil lines to be disconnected, and the primary loop does not work, and the active control anti-yaw damper 100 is automatically switched to other modes.

In the present embodiment, the active control anti-yaw damper 100 further includes a drive mechanism connected in series with any of the drive oil lines, so as to provide driving force for flowing oil in the primary loop. The drive mechanism includes a drive motor and a drive pump, and the drive pump is connected in series with the drive oil line and connected with the drive motor. The drive motor is configured to drive the drive pump to apply a pumping force to the drive oil line, so that the drive oil line where the drive mechanism is located keep supplying oil to the reversing valve PV3, and drives the flow direction of oil in the primary loop to be changed according to the state of the reversing valve PV3, which in turn drives the piston 2 to reciprocate.

Figure 3:
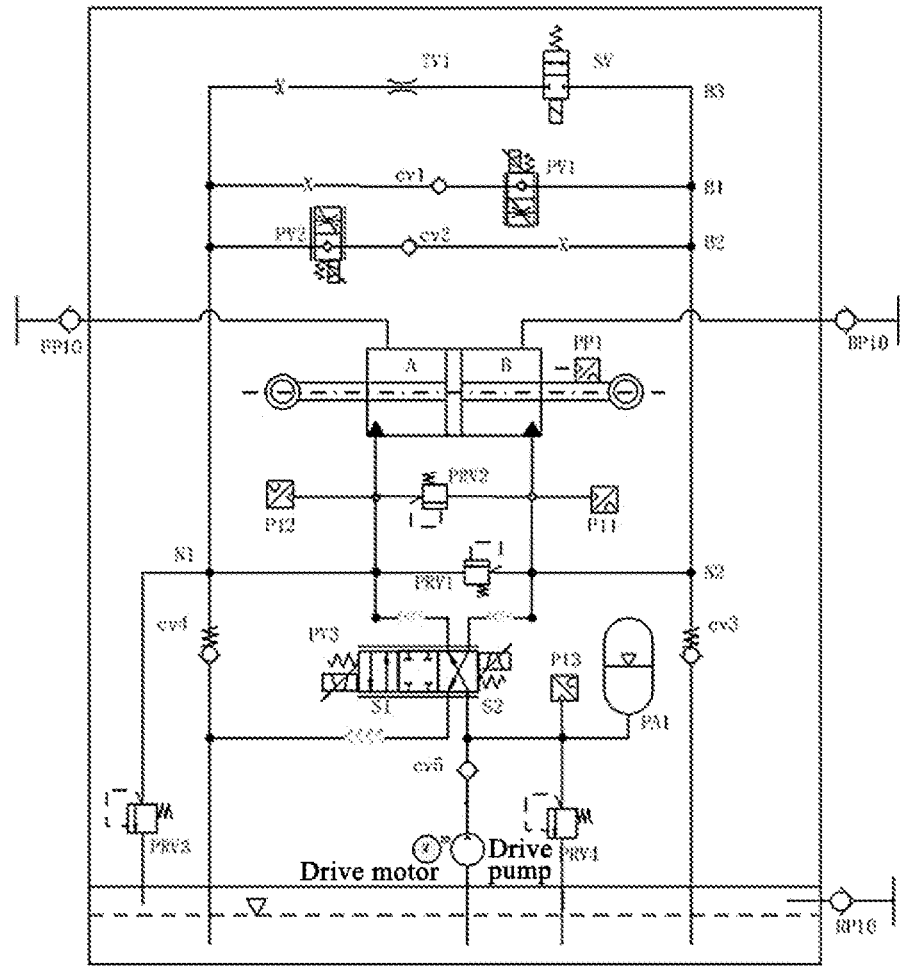
FIG. 3 is a first schematic diagram showing a state of a branch of an active control anti-yaw damper in an active mode according to an embodiment of the present application.

In an alternative embodiment, as shown in FIG. 3, when the reversing valve PV3 is in the first working position S1, the drive pump on a drive oil line on the right side produces a driving effect to pump the oil inside the oil reservoir into the reversing valve PV3, then the oil flows into the main oil line on the right after passing through a flow path inside the first working position S1 of the reversing valve PV3, and enters the second cylinder PB of the hydraulic cylinder 1, and then drives the piston 2 to move to the left; when the piston 2 moves to the left, the oil inside the first cylinder PA is pumped into the main oil line on the left, and then enters the other flow path inside the first working position S1 of the reversing valve PV3, and then the oil automatically flow into the drive oil line on the left from the reversing valve PV3 and finally returns to the oil reservoir. The two flow paths in the first working position S1 of the reversing valve PV3 are arranged in parallel.

Figure 4:
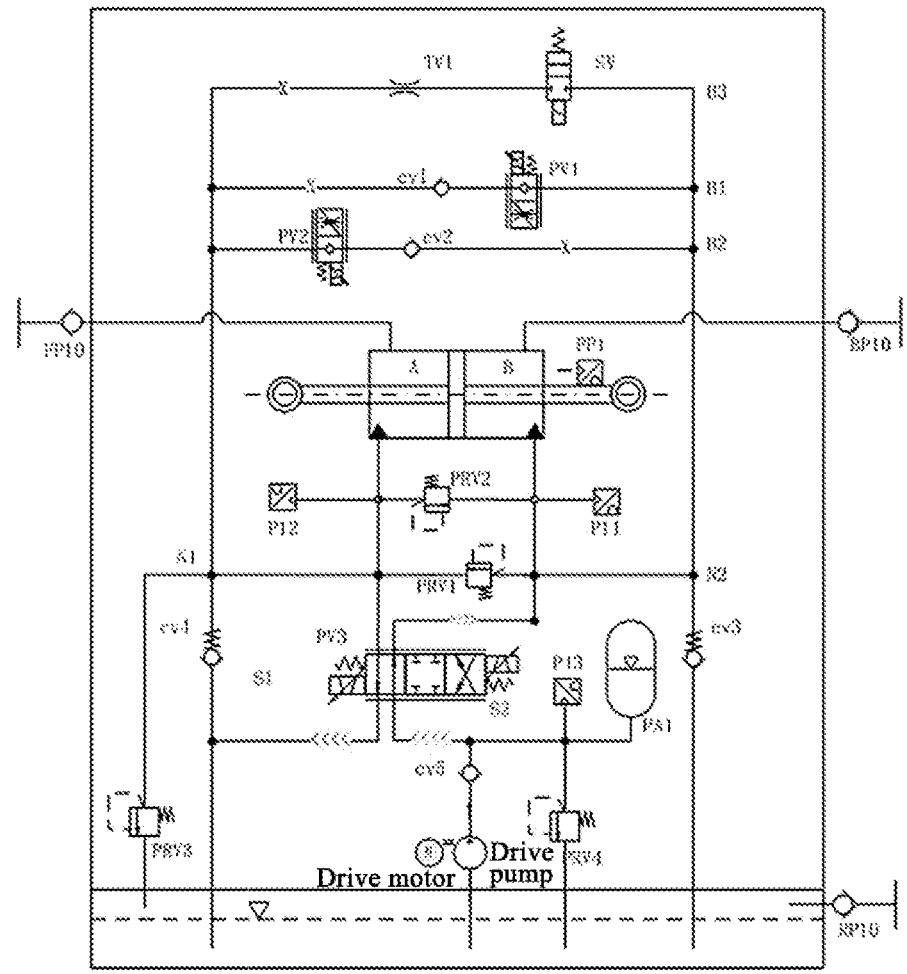
FIG. 4 is a second schematic diagram showing a state of a branch of an active control anti-yaw damper in an active mode according to an embodiment of the present application.

As shown in FIG. 4, when the reversing valve PV3 is in the second working position S2, the drive pump on a drive oil line on the right produces a driving effect to pump the oil inside the oil reservoir into the reversing valve PV3, then the oil flows into the main oil line on the left after passing through a flow path inside the second working position S2 of the reversing valve PV3, and enters the first cylinder PA of the hydraulic cylinder 1, and then drives the piston 2 to move to the right; when the piston 2 moves to the right, the oil inside the second cylinder PB is pumped into the main oil line on the right, and then enters the other flow path inside the second working position S2 of the reversing valve PV3, and then the oil automatically flow into the drive oil line on the left from the reversing valve PV3 and finally returns to the oil reservoir. The two flow paths in the second working position S2 of the reversing valve PV3 are arranged crosswise, but these two flow paths are not communicated with each other.

The above embodiment gives an internal structure arrangement and reversing mode of the reversing valve PV3. It should be understood that other structures may be used, as long as it plays a reversing role in the main oil line, so as to drive the piston 2 to reciprocate inside the hydraulic cylinder 1.

In the present embodiment, the damper further includes an accumulation branch. The accumulation branch has one end communicating with the drive oil line and located between the reversing valve PV3 and the drive mechanism and other end communicating with the oil reservoir, so that the accumulation branch is connected in parallel to both ends of the drive mechanism. The accumulator PA1 is connected in series on the accumulation branch, so that the accumulator PA1 is connected in parallel at both ends of the drive mechanism. When the reversing valve PV3 is in the closed station (that is, the reversing valve PV3 does not work), oil is accumulated in advance inside the accumulator PA1 based on a circuit formed between the drive mechanism and the accumulator PV1, so that the pre-accumulated oil may be input into the drive oil line as supplementary power when the power of the drive pump cannot meet the dynamic requirements of the vehicle curve operation, so as to supplement the kinetic energy to flowing of oil inside the primary loop.

In the present embodiment, in order to reasonably use the accumulator PA1 to supplement power in the primary loop, it is preferable to connect pressure sensors P13 in series with the accumulation branch. The pressure sensors P13 may perform necessary pressure monitoring on the accumulator PA1. Using the controller 3, a pressure peak value F0 may be preset for the accumulator PA1. When the real-time pressure value of the accumulator PA1 is lower than the set pressure peak value F0, the drive mechanism starts to run and drives the oil to flow into the accumulation branch from the drive oil line, and then into the accumulator PA1 until the hydraulic pressure accumulated in the accumulator PA1 reaches or exceeds the peak pressure F0.

In order to reasonably control the hydraulic pressure in the accumulator PA1 and prevent the occurrence of danger due to too high pressure, it is preferable that a relief valve PRV4 is also connected in series on the accumulation branch. The relief valve PRV4 is configured to limit the maximum pressure value of the accumulator PA1 and the accumulation branch.

In order to meet the requirement of real-time adjustment of various performance parameters according to operating requirements when the vehicle is normally traveling in a straight line, as shown in FIG. 2, the damper 100 in the embodiment further includes at least two parallel branches. Both ends of each branch communicate with the two main oil lines, respectively. Each branch is equipped with an adjustable solenoid valve PV configured to adjust the damping force of the oil passing through the branch when the damper 100 is in normal operation and in the semi-active mode, thereby adjusting the damping coefficient of the damper, and then further adjusting various performance parameters of the damper in normal operation in real time so as to semi-actively control the damper.

When the active control anti-yaw damper 100 is in normal operation and in the semi-active mode, the piston 2 reciprocates inside the hydraulic cylinder 1, so that an oil pressure difference is generated between the two cylinder blocks in the hydraulic cylinder 1. The oil flows and switches between various branches according to the change of the oil pressure difference. The damping force of oil is adjusted using adjustable solenoid valves PV1 and PV2 on the corresponding branches through which oil passes and thus the damper 100 is ensured to have a controllable damping force and damping coefficient in the semi-active mode.

In order to facilitate oil line control, two parallel branches are provided on the damper 100. An inlet of one branch communicates with the first cylinder PA, and the outlet of one branch communicates with the second cylinder PB; an inlet of the other branch communicates with the second cylinder PB, and an outlet of the other branch communicates with the first cylinder PA. In other words, oil in the two parallel branches flows in opposite directions.

In order to reasonably control the flow direction of each branch, each branch described in the present embodiment respectively includes one-way throttle valves CV1, CV2 and adjustable solenoid valves PV1, PV2 connected in series. According to the preset flow direction of each branch, the one-way throttle valves CV1, CV2 and the adjustable solenoid valve PV1, PV2 are connected in series on the same branch so that oil flowing in the reverse direction may be blocked in time and the flow direction of oil inside the branch is limited reasonably. Preferably, the adjustable solenoid valves PV1 and PV2 are solenoid proportional valves, so that the damping force of the oil flowing through the branch may be adjusted more accurately.

It is understandable that three or more parallel branches may be provided in the damper, as long as all the branches are connected in parallel, all the branches are divided into two groups and oil in the two groups of branches has an opposite flow direction such that semi-actively controlling for the damper can be achieved.

In the present embodiment, as shown in FIG. 2, the branch includes a first branch B1 and a second branch B2. One end of the first branch B1 and one end of the second branch B2 are connected in parallel to a first node N1 and the other end of the first branch B1 and the other end of the second branch B2 are connected in parallel with the second node N2, and the first node N1 and the second node N2 are connected with the two cylinder blocks of the hydraulic cylinder 1, respectively.

In the present embodiment, the first branch B1 has an opposite flow direction to the second branch B2. Specifically, the first branch B1 includes a first one-way throttle valve CV1 and a first adjustable solenoid valve PV1 connected in series. Base on the controlling of the first one-way throttle valve CV1, the oil in the first branch B1 can have a flow direction as follows: after flowing out of the first cylinder PA, oil flows through the first branch B1 and then flows back into the second cylinder PB. The second branch B2 includes a second one-way throttle valve CV2 and a second adjustable solenoid valve PV2. Based on the controlling of the second one-way throttle valve CV2, the oil in the second branch B2 can have a flow direction as follows: after flowing out of the second cylinder PB, oil flows through the second branch B2 and then flows back into the first cylinder PA.

Figure 5:
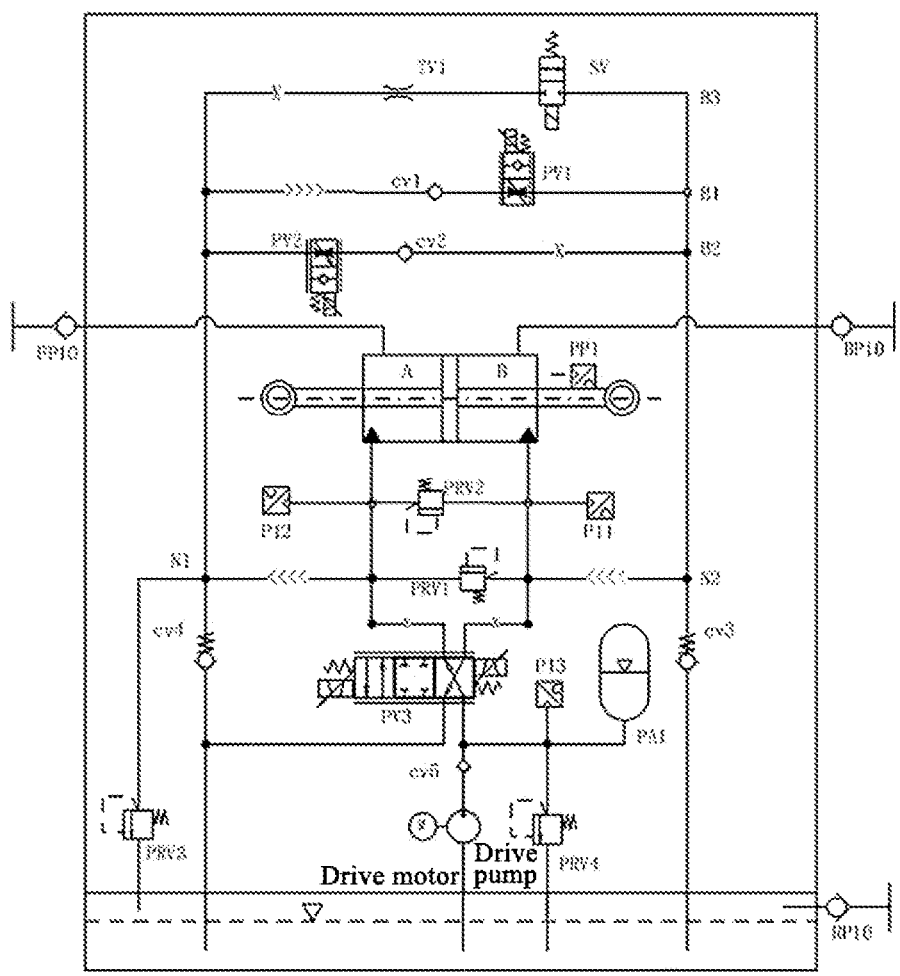
FIG. 5 is a first schematic diagram showing a state of a branch of an active control anti-yaw damper in a semi-active mode according to an embodiment of the present application.

When the damper is in the semi-active mode, as shown in FIG. 5, when the oil pressure inside the first cylinder PA of the hydraulic cylinder 1 is greater than that inside the second cylinder PB, after flowing out of the first cylinder PA, oil flows through the first node N1 via the left main oil line and then enters the first branch B1. The oil out of the first branch B1 flows through the second node N2 and then flows back to the right main oil line and finally flows back to the second cylinder PB, so that an oil control circuit is formed between the first branch B1 and the hydraulic cylinder 1. The second throttle valve in the second branch B2 has the oil kept between the first node N1 and the second throttle valve, so that the oil fails to flow through the second branch B2 to form a control circuit. In this case, the first adjustable solenoid valve PV1 may accurately adjust the damping force of the oil in the first branch B1, i.e., may adjust the system damping coefficient of the damper, so as to adjust performance parameters of the damper in real time and reliably.

Figure 6:
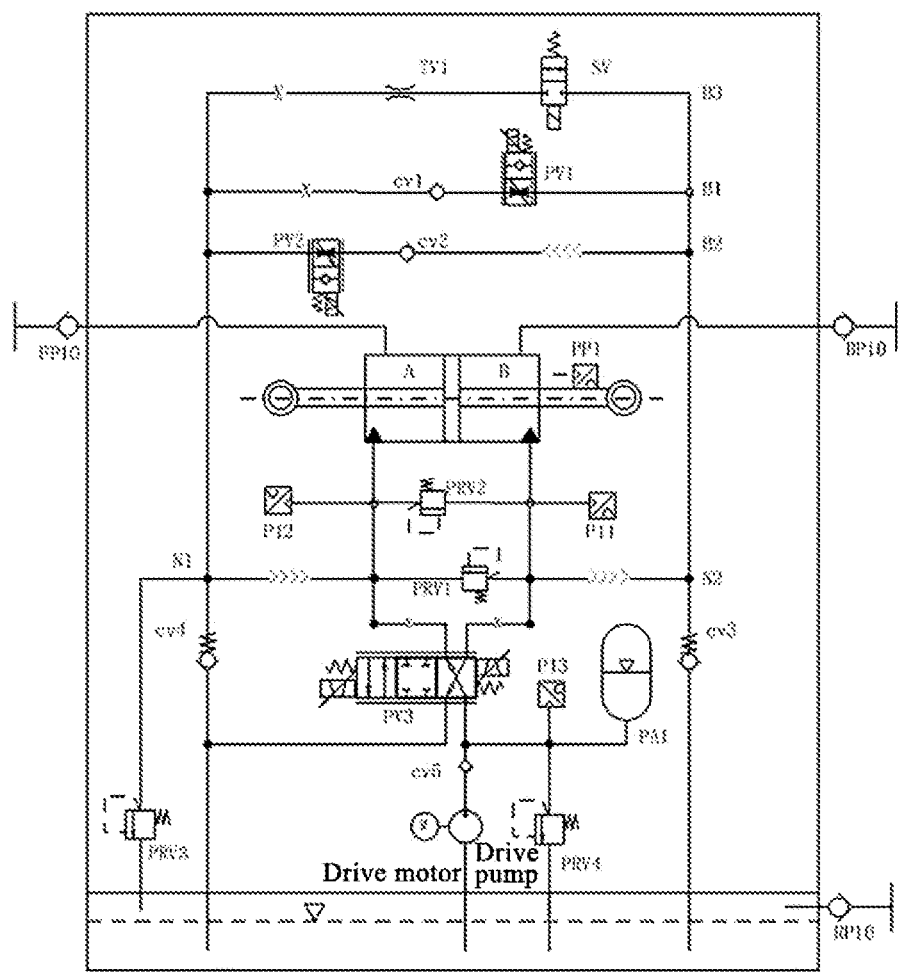
FIG. 6 is a second schematic diagram showing a state of a branch of an active control anti-yaw damper in a semi-active mode according to an embodiment of the present application.

Similarly, as shown in FIG. 6, when the damper is in the semi-active mode, as the oil pressure inside the second cylinder PB of the hydraulic cylinder 1 is greater than that inside the first cylinder PA, after flowing out of the second cylinder PB, oil flows through the second node N2 and then enters the second branch B2, and the oil out of the second branch B2 flows through the first node N1 and then flows back to the first cylinder PA, so that another oil control circuit is formed between the second branch B2 and the hydraulic cylinder 1. The first throttle valve in the first branch B1 has the oil kept between the second node N2 and the first throttle valve, so that the oil fails to flow through the first branch B1 to form a control circuit. In this case, the second adjustable solenoid valve PV2 may accurately adjust the damping force of the oil in the second branch B2, i.e., may adjust the system damping coefficient of the damper, so as to adjust performance parameters of the damper in real time and reliably.

In order to ensure that the damper can operate normally in the event of a fault or power off, the damper of the present embodiment further includes an emergency oil line B3. Both ends of the emergency oil line B3 are connected to the two main oil lines, respectively. As shown in FIG. 5, preferably one end of the emergency oil line B3 is connected to the first node N1, and the other end of the emergency oil line B3 is connected to the second node N2, so as to ensure that the emergency oil line B3 is connected in parallel with all other branches. In order to ensure that the emergency oil line B3 may normally provide an oil closed-loop circuit for the hydraulic cylinder 1 in a power off state, the emergency oil line B3 is provided with a non-adjustable solenoid switch valve SV. The non-adjustable solenoid switch valve SV is configured to enable the emergency oil line B3 when the damper is in a passive mode so that the damper may use the emergency oil line B3 in the event of a fault or power off, thereby being switched to the passive mode.

Figure 7:
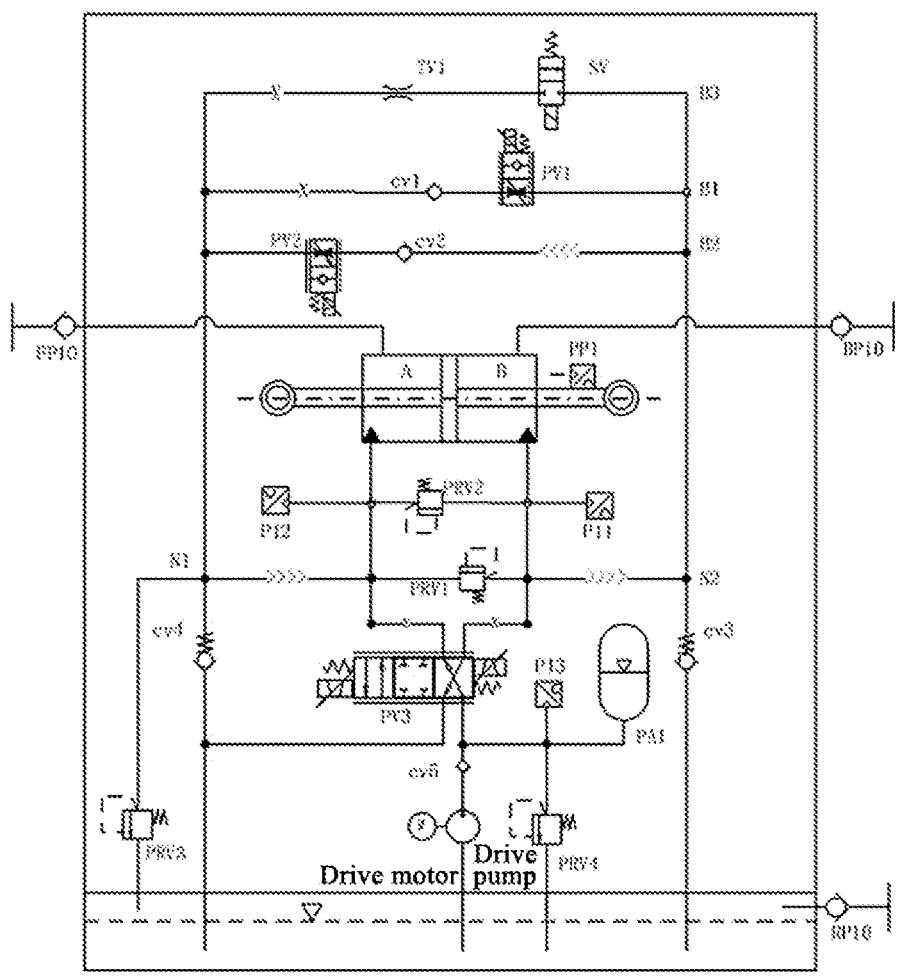
FIG. 7 is a schematic diagram showing a state of a branch of an active control anti-yaw damper in a passive mode according to an embodiment of the present application.

In the present embodiment, as shown in FIG. 7, the emergency oil line B3 includes an emergency throttle valve TV1 and a solenoid switch valve SV connected in series. In the passive mode, the remaining branches except emergency oil line B3 are interrupted due to power off of the one-way throttle valve and adjustable solenoid valve PV on each branch, which blocks the flowing of oil along the corresponding branch. While the solenoid switch valve SV in the emergency oil line B3 may be turned on manually, or automatically turn into the turn-on state after power off, so as to ensure that the oil flowing out of the hydraulic cylinder 1 may flow through the emergency oil line B3 and then flow back into the hydraulic cylinder 1 so that an oil emergency control circuit is ensured to be formed between the emergency oil line B3 and the hydraulic cylinder 1.

In the present embodiment, the emergency throttle valve TV1 of the emergency oil line B3 is a non-adjustable limit orifice, and the solenoid switch valve SV fails to adjust a flow rate and a damping force of oil inside the emergency oil line B3. Therefore, when oil flows through the emergency oil line B3, all other branches are blocked and the damper is in the passive mode.

It is understandable that the damper of the present embodiment also has a small damping mode in addition to the above-mentioned semi-active mode and passive mode.

When the train is running in a straight line, as shown in FIGS. 5 and 6, the damper is in the semi-active mode. In this case, the solenoid switch valve SV of the emergency oil line B3 is in a charged normally closed state, and the adjustable solenoid valves PV1 and PV2 of each branch are in a charged state. In this case, the system damping force of the damper is generated by the hydraulic oil flowing through the adjustable solenoid valve PV, and the magnitude of the damping coefficient is determined by a control voltage of corresponding adjustable solenoid valve PV. In order to stably control the oil line, the first adjustable solenoid valve PV1 in the first branch B1 has equal control voltage to the second adjustable solenoid valve PV2 in the second branch B2.

When the train is running in a curve, as shown in FIGS. 3 and 4, the damper is in the active mode. In this case, the solenoid switch valve SV of the emergency oil line B3 and the adjustable solenoid valves PV1 and PV2 of all branches are in a power-off state. The drive motor and drive pump are activated to start the primary loop and act as a driving source for the reciprocating movement of the piston 2. The working positions are continuously switched through the reversing valve PV3 so that the oil flow direction of the primary loop is repeatedly changed at a preset frequency, thereby driving the piston 2 to reciprocate inside the hydraulic cylinder 1. In this case, the damper is in a displacement control state, and the displacement of the piston 2 may be adjusted in real time through the reversing valve PV3 as required.

When the damper is in the passive mode, as shown in FIG. 7, the damper is in a fault or power-off state, and the adjustable solenoid valve PV and one-way throttle valve of each branch stop working, so that the circulation state of each branch is completely blocked, and the oil is in a non-circulation state in the branch. In this case, the non-adjustable solenoid switch valve SV of the emergency oil line B3 is activated, so that the oil flows through the emergency oil line B3 to form a control circuit. The damping force of the damper is generated by the hydraulic oil flows through the non-adjustable emergency throttle valve TV1.

When the damper is in the small damping mode, the solenoid switch valve SV of the emergency oil line B3 is turned on, and the adjustable solenoid valves PV of all branches are turned on in charged state, then all branches are not in the blocking state. The damping coefficient of the adjustable solenoid valve PV on the corresponding branch can be adjusted to be the minimum by controlling the control voltage of the adjustable solenoid valve PV on the remaining branches. In this case, the oil may flow through all branches including the emergency oil line B3 and generate a damping force. In this case, the damping force generated by the damper is very small, and the damper is regarded as being a small damping mode, which is suitable for use in small damping conditions such as entry and exit easement curves. Easement curve refers to a curve whose curvature is continuously changed between a straight line and a circular curve or between circular curves in a plane linear shape. Easement curve is one of the linear elements of the road plane and is a curve whose curvature is continuously changed and provided between a straight line and a circular curve or between two circular curves having the same turning and a large difference in radius. When the vehicle follows the easement curve, the working conditions when entering the easement curve and exiting the easement curve are small damping conditions.

In the present embodiment, in order to prevent the oil pressure of the damper from being too high, and to improve the safety of the damper when adjusting parameters such as unloading force, unloading speed, and damping coefficient, it is preferable that the first node N1 and the second node N2 each is connected to the two cylinder blocks of the hydraulic cylinder 1 through a main oil line, at least one relief branch is connected between the two main oil lines, and all the relief branches are connected to each other in parallel. A relief valve is connected in series on the relief branch.

In the present embodiment, two relief branches are connected in parallel between the two main oil lines, and each of the two relief branches is connected with a relief valve PRV1 and a relief valve PRV2 in series. The relief valve PRV1 and the relief valve PRV2 separately and cooperatively limit a maximum damping force of the damper, and may cooperate with the adjustable solenoid valve PV in each branch to safely and accurately adjust the unloading force, unloading speed and damping coefficient of the damper.

In the damper of the present embodiment, the two main oil lines communicate with the oil reservoir through the oil reservoir lines, respectively. Specifically, the first node N1 and the second node N2 communicate with the oil reservoir through an oil reservoir lines, respectively. Throttle valves, namely the third throttle valve CV3 and the fourth throttle valve CV4 are respectively connected in series on the two oil reservoir lines. The third throttle valve CV3 and the fourth throttle valve CV4 are preferably spring-loaded check valves. When the pressure in any cylinder block of the hydraulic cylinder 1 is lower than the atmospheric pressure, oil may be directly sucked into the cylinder block from the oil reservoir through the movement of the piston 2 using the third throttle valve CV3 and/or the fourth throttle valve CV4, which may compensate possible leakage problems and prevent cavitation in the hydraulic cylinder.

In the present embodiments, a relief oil line communicates between the first node N1 and the oil reservoir, the relief oil line is connected in parallel with each of the oil reservoir lines, and a relief valve PRV3 is installed in series on the relief oil line. The relief valve PRV3 may limit the maximum pressure inside the oil reservoir. The relief valve PRV3 is preset with a maximum safety pressure value P0. Once the pressure inside the oil reservoir is greater than the safety pressure value P0, the relief valve PRV3 is opened immediately, and the oil in the main oil line of the damper flows directly back into the oil reservoir. A reservoir port RP10 is provided on the oil reservoir to increase or decrease the amount of oil inside the oil reservoir and control an oil level and oil pressure as required.

As shown in FIG. 1, a damping system according to an embodiment of the present application includes a controller 3 and at least one active control anti-yaw damper 100 as described above installed on a bogie. A signal input end and a signal output end of the controller 3 are connected with each of the dampers 100, respectively. The controller 3 is configured to calculate currently required performance parameters of the damper according to the actual state of the vehicle operation. The performance parameters include but are not limited to a damping force, a damping coefficient and a piston displacement. The controller 3 transmits the control signal with the current performance parameters to the damper, so as to ensure that the damper may adjust various performance parameters in real time according to operation requirements of the vehicle.

In order to ensure that the controller 3 has a reliable data source during calculation, and a good and stable signal control circuit is formed between the controller 3 and the damper. Preferably, the system also includes a data acquisition mechanism. The data acquisition mechanism is installed on the damper and connected to the signal input end of the controller 3. The data acquisition mechanism is configured to transmit the real-time working parameters of the damper to the controller 3, so that the controller 3 may calculate performance parameters required by the damper based on the real-time working parameters and feed control signals containing the preset performance parameter values back to the damper 100.

In the present embodiment, at least two data interfaces are provided on the controller 3. The controller 3 in the present embodiment mainly includes a first interface C1, a second interface C2, and a third interface C3. Among them, the first interface C1 is a signal output end, the second interface C2 is a signal input end, and the third interface C3 is a power supply and external device access end. The first interface C1 is connected to the adjustable solenoid valves PV1, PV2 of each branch on the damper, and is configured to adjust control voltages of the adjustable solenoid valves PV1, PV2 and other parameters in real time according to the calculation result of the controller 3 so as to adjust the performance parameters of the damper 100.

The data acquisition mechanism of the present embodiment includes pressure sensors P11, P12, P13 and displacement sensor PP1. The two cylinder blocks of the hydraulic cylinder 1 are respectively provided with pressure sensors PP1. The pressure sensors P11, P12, P13 and the displacement sensor PP1 are respectively connected to the second interface C2 as a signal input end on the controller 3. The pressure sensors P11 and P12 are installed on the first cylinder PA and the second cylinder PB, respectively to sense the oil pressure values inside the two cylinder blocks on both sides of the piston 2 inside the hydraulic cylinder 1 in real time. The pressure sensor P13 is connected in series with the accumulation branch to sense the pressure value of the accumulator PA1. The displacement sensor PP1 is installed on the piston 2 or a piston rod, so as to sense the displacement of the piston 2 or the piston rod inside the damper 100 with respect to the entire hydraulic cylinder 1 in real time.

The data acquisition mechanism of the present embodiment also includes an acceleration sensor. The acceleration sensor is connected to the second interface C2 as a signal input end on the controller 3. The acceleration sensor is installed on the vehicle and is configured to provide the controller 3 with acceleration data during the vehicle is running, so as to be used as reference data when the controller 3 calculates the required parameters of the damper.

The controller 3 of the present embodiment is also provided with an external interface, and the external interface is connected to a vehicle general control system. A cut-off relay 4 is installed between the controller 3 and the vehicle general control system. The cut-off relay 4 is linked with the on-board instability monitoring system. Once the bogie instability monitoring system gives an alarm, the cut-off relay 4 may work and cut off the power supply of the semi-active anti-yaw damper such that the whole damper system is powered off, and the damper is forcibly switched to the passive mode. In this case, the damper has the same performance as the traditional passive damper, which is sufficient to ensure that the vehicle continues to operate normally.

When the piston 2 of the active control anti-yaw damper 100 according to embodiments of the present application reciprocates inside a hydraulic cylinder, an interior of the hydraulic cylinder 1 is divided into two cylinder blocks PA, PB which communicate with an oil reservoir through two main oil lines respectively to form a primary loop between the hydraulic cylinder 1 and the oil reservoir; a reversing valve PA3 is installed between the two main oil lines and the oil reservoir and is configured to change the flow direction of the primary loop when the active control anti-yaw damper 100 is in an active mode and adjust the displacement of the piston 2 within the hydraulic cylinder 1. When the damper 100 is switched to the active mode, the displacement of the piston is changed by the oil pressure difference between the two cylinder blocks PA, PB inside the hydraulic cylinder 1, thereby solving various defects due to failure of adjustment for the performance parameters of the traditional anti-yaw dampers 100 in the prior art, especially that the bogie is in a radial position relative to the vehicle body when the vehicle runs in a curve, so as to increase the curve negotiation speed of the train, reduce the wheel-rail wear, and prolong the service life of the vehicle.

The damping system according to embodiments of the present application includes a controller 3 and at least one above-mentioned active control anti-yaw damper 100 installed on the bogie, and the signal input end and the signal output end of the controller 3 are connected to each damper 100, respectively. The required performance parameters of the damper are calculated according to the actual operation state of the vehicle using the controller 3, the controller 3 then transmits control signals with the current performance parameters to the damper 100, so as to ensure that the damper 100 may adjust various performance parameters in real time according to the operation requirements of the vehicle so that a suspension system of the train keeps being in the best matching state, and may be compatible with different geographic environments, operation demands of vehicles required by different lines, and the repair cycle of vehicles may be effectively extended, the service life of the vehicle is prolonged and the operating costs are decreased.

The embodiments of the present disclosure have been presented for purposes of illustration and description, and are not intended to be exhaustive or to limit the application to the form disclosed. Many modifications and variations are apparent to those skilled in the art. The embodiments are selected and described in order to best explain the principles and embodiments of the present disclosure, and can be understood by those skilled in the art to design various embodiments with various modifications suitable for the particular application.

What is claimed is:

1. An active control anti-yaw damper, comprising:
a hydraulic cylinder;
a piston configured to divide an interior of the hydraulic cylinder into two cylinder blocks when reciprocating inside the hydraulic cylinder,
an oil reservoir; and
a reversing valve,
wherein the two cylinder blocks communicate with the oil reservoir through two main oil lines respectively to form a primary loop; the reversing valve is installed between the two main oil lines and the oil reservoir and is configured to change a flow direction of the primary loop when the active control anti-yaw damper is in an active mode and adjust a displacement of the piston within the hydraulic cylinder;
the two cylinder blocks communicate with the reversing valve through the two main oil lines, respectively, and the reversing valve communicates with the oil reservoir through two drive oil lines, respectively, and the reversing valve has at least two switchable working positions;
the active control anti-yaw damper further comprises a drive mechanism connected in series on any of the drive oil lines; an accumulation branch having an end communicating with any of the drive oil lines and being located between the reversing valve and the drive mechanism and another end communicating with the oil reservoir, wherein a pressure sensor, an accumulator and a relief valve are connected in series on the accumulation branch.

2. The active control anti-yaw damper of claim 1, wherein the reversing valve comprises a first working position and a second working position, the first working position and the second working position are each provided with two diversion ports configured to connect the two main oil lines; and the two diversion ports at the first working position have positions opposite to that of the two diversion ports at the second working position.

3. The active control anti-yaw damper of claim 1, wherein the drive mechanism comprises a drive motor and a drive pump, and the drive pump is connected in series on any of the drive oil lines and connected with the drive motor.

4. The active control anti-yaw damper of claim 1, wherein at least two relief branches are presented between the two main oil lines, the at least two relief branches are connected in parallel with each other, and each relief branch is connected in series with a relief valve.

5. The active control anti-yaw damper of claim 1, further comprising at least two parallel branches, each of the parallel branches has two ends communicating with the two main oil lines, respectively, each of the parallel branches comprises a one-way throttle valve and an adjustable solenoid valve communicated in series, and the adjustable solenoid valve is configured to adjust a damping coefficient of the active control anti-yaw damper when the active control anti-yaw damper is in a semi-active mode.

6. The active control anti-yaw damper of claim 5, wherein each of the parallel branches comprises a first branch and a second branch, wherein an end of the first branch and an end of the second branch are connected in parallel at a first node, and another end of the first branch and another end of the second branch are connected in parallel at a second node, and the first node and the second node are communicated to the two main oil lines, respectively; the first branch has an opposite flow direction to the second branch.

7. The active control anti-yaw damper of claim 6, wherein the first node and the second node communicate with the oil reservoir through oil reservoir lines, respectively, and each of the oil reservoir lines is connected in series with a throttle valve.

8. The active control anti-yaw damper of claim 7, wherein a relief oil line is presented between the first node and the oil reservoir, the relief oil line is in parallel with respective oil reservoir lines, and a relief valve is connected in series on the relief oil line.

9. The active control anti-yaw damper of claim 4, further comprising an emergency oil line having two ends respectively connected to the two main oil lines, wherein the emergency oil line comprises an emergency throttle valve and a non-adjustable solenoid switch valve connected in series, and the solenoid switch valve is configured to enable the emergency oil line when the active control anti-yaw damper is in a passive mode.

10. A damping system, comprising:
a controller; and
at least one active control anti-yaw damper provided on a bogie, the at least one active control anti-yaw damper includes a hydraulic cylinder; a piston configured to divide an interior of the hydraulic cylinder into two cylinder blocks when reciprocating inside the hydraulic cylinder, an oil reservoir; and a reversing valve, wherein the two cylinder blocks communicate with the oil reservoir through two main oil lines respectively to form a primary loop; the reversing valve is installed between the two main oil lines and the oil reservoir and is configured to change a flow direction of the primary loop when the active control anti-yaw damper is in an active mode and adjust a displacement of the piston within the hydraulic cylinder;
the two cylinder blocks communicate with the reversing valve through the two main oil lines, respectively, and the reversing valve communicates with the oil reservoir through two drive oil lines, respectively, and the reversing valve has at least two switchable working positions;
the active control anti-yaw damper further comprises a drive mechanism connected in series on any of the drive oil lines; an accumulation branch having an end communicating with any of the drive oil lines and being located between the reversing valve and the drive mechanism and another end communicating with the oil reservoir, wherein a pressure sensor, an accumulator and a relief valve are connected in series on the accumulation branch;
wherein a signal input end and a signal output end of the controller are connected with a respective one of the at least one active control anti-yaw damper.

11. The active control anti-yaw damper of claim 10, further comprising a data acquisition mechanism including a pressure sensor and a displacement sensor, wherein the pressure sensor is provided inside the two cylinder blocks of the hydraulic cylinder, respectively, the displacement sensor is provided on the piston, and the pressure sensor and the displacement sensor are connected to the signal input end of the controller, respectively.

12. A vehicle comprising the damping system of claim 10.

13. The active control anti-yaw damper of claim 1, further comprising at least two parallel branches, each of the parallel branches has two ends communicating with the two main oil lines, respectively, each of the parallel branches comprises a one-way throttle valve and an adjustable solenoid valve communicated in series, and the adjustable solenoid valve is configured to adjust a damping coefficient of the active control anti-yaw damper when the active control anti-yaw damper is in a semi-active mode.

14. The active control anti-yaw damper of claim 2, further comprising at least two parallel branches, each of the parallel branches has two ends communicating with the two main oil lines, respectively, each of the parallel branches comprises a one-way throttle valve and an adjustable solenoid valve communicated in series, and the adjustable solenoid valve is configured to adjust a damping coefficient of the active control anti-yaw damper when the active control anti-yaw damper is in a semi-active mode.

15. The active control anti-yaw damper of claim 1, further comprising at least two parallel branches, each of the parallel branches has two ends communicating with the two main oil lines, respectively, each of the parallel branches comprises a one-way throttle valve and an adjustable solenoid valve communicated in series, and the adjustable solenoid valve is configured to adjust a damping coefficient of the active control anti-yaw damper when the active control anti-yaw damper is in a semi-active mode.

16. The active control anti-yaw damper of claim 3, further comprising at least two parallel branches, each of the parallel branches has two ends communicating with the two main oil lines, respectively, each of the parallel branches comprises a one-way throttle valve and an adjustable solenoid valve communicated in series, and the adjustable solenoid valve is configured to adjust a damping coefficient of the active control anti-yaw damper when the active control anti-yaw damper is in a semi-active mode.

17. A vehicle comprising the damping system of claim 11.

* * * * *